Figure 1:
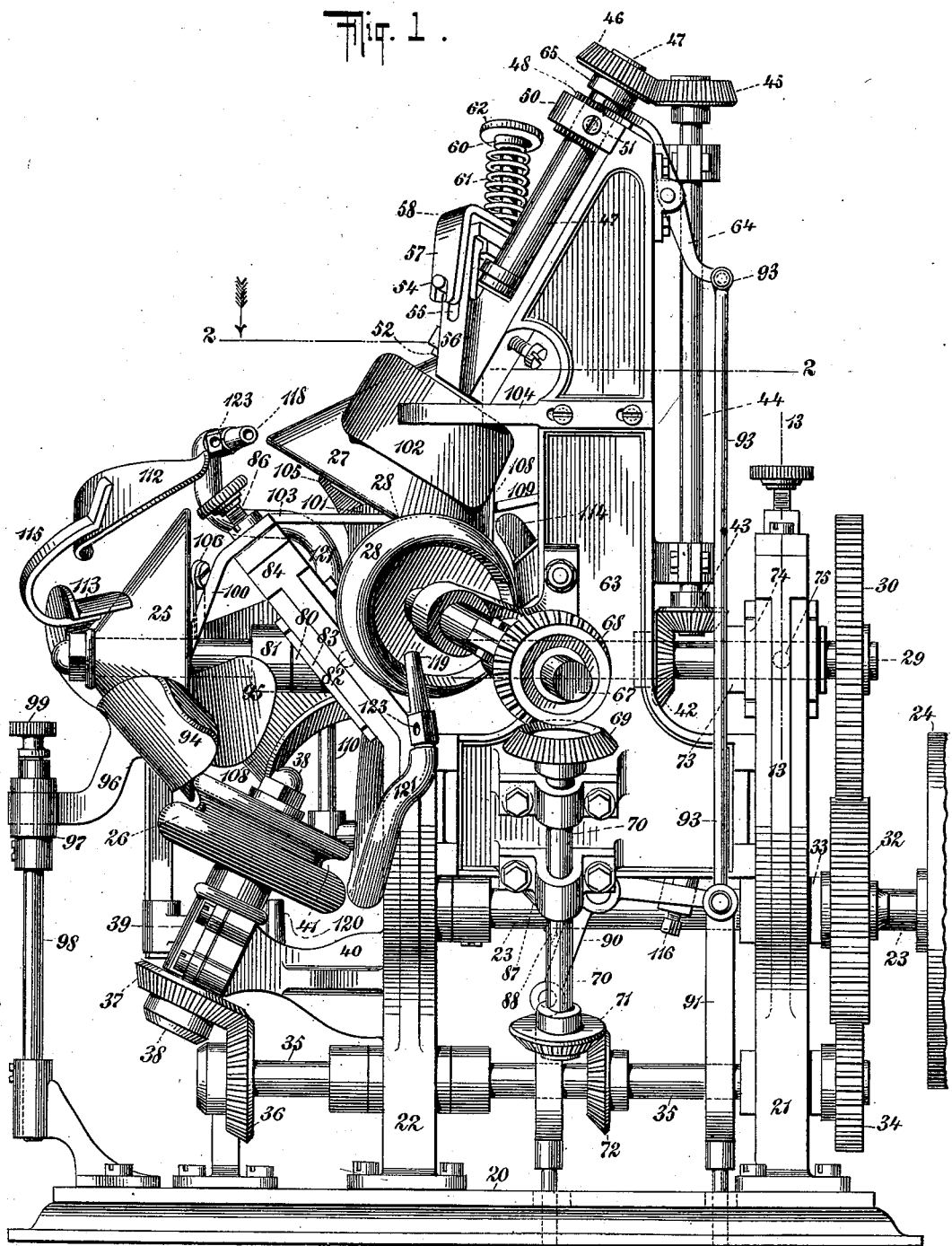

No. 646,784. Patented Apr. 3, 1900.
W. A. ZEIDLER.
MACHINE FOR FOLDING AND SHAPING TURN-DOWN COLLARS.
(Application filed Dec. 15, 1899.)

(No Model.) 6 Sheets—Sheet 1.

WITNESSES
Gustave Dieterich
John Kehlenbeck

INVENTOR
William A. Zeidler
BY Chas. C. Gill
ATTORNEY

No. 646,784. Patented Apr. 3, 1900.
W. A. ZEIDLER.
MACHINE FOR FOLDING AND SHAPING TURN-DOWN COLLARS.
(Application filed Dec. 15, 1899.)
(No Model.) 6 Sheets—Sheet 2.

WITNESSES:
Gustave Dieterich
John Kehlenbeck

INVENTOR
William A. Zeidler
BY Chas. E. Gill
ATTORNEY

No. 646,784. Patented Apr. 3, 1900.
W. A. ZEIDLER.
MACHINE FOR FOLDING AND SHAPING TURN-DOWN COLLARS.
(Application filed Dec. 15, 1899.)
(No Model.) 6 Sheets—Sheet 3.
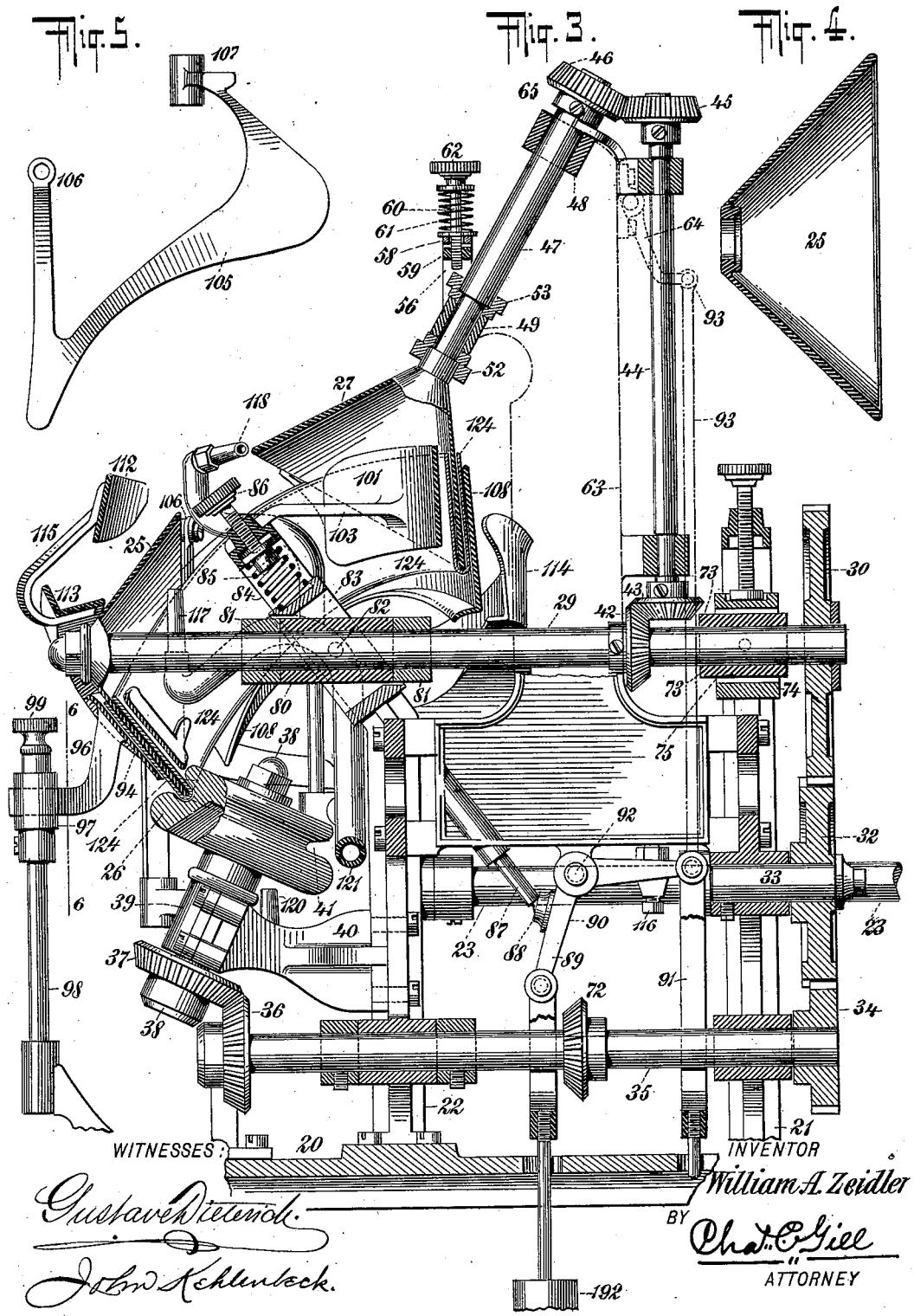
WITNESSES:
Gustave Dieterich
John Kohlenbeck
INVENTOR
William A. Zeidler
BY Chas. C. Gill
ATTORNEY

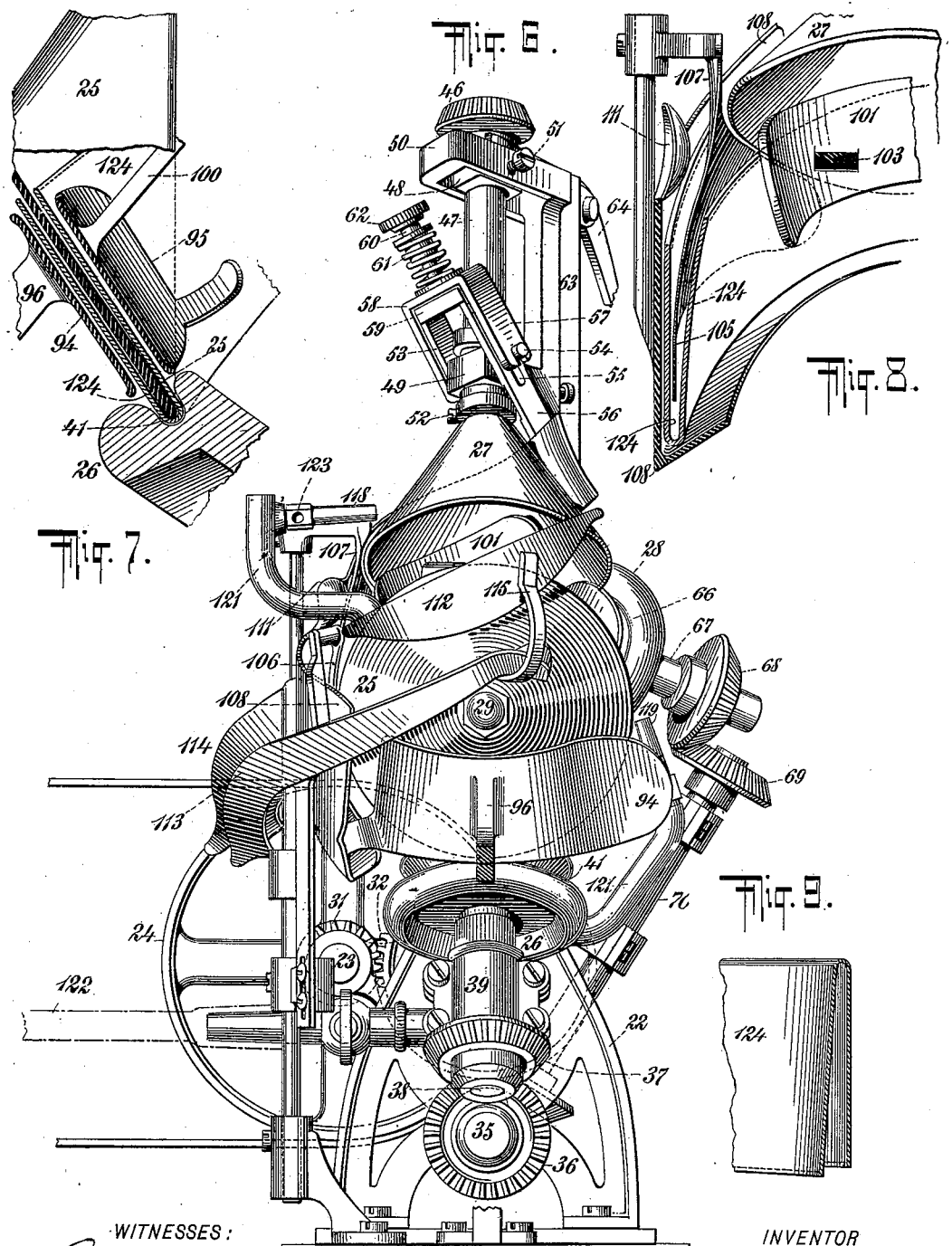

No. 646,784. Patented Apr. 3, 1900.
W. A. ZEIDLER.
MACHINE FOR FOLDING AND SHAPING TURN-DOWN COLLARS.
(Application filed Dec. 15, 1899.)
(No Model.) 6 Sheets—Sheet 5.
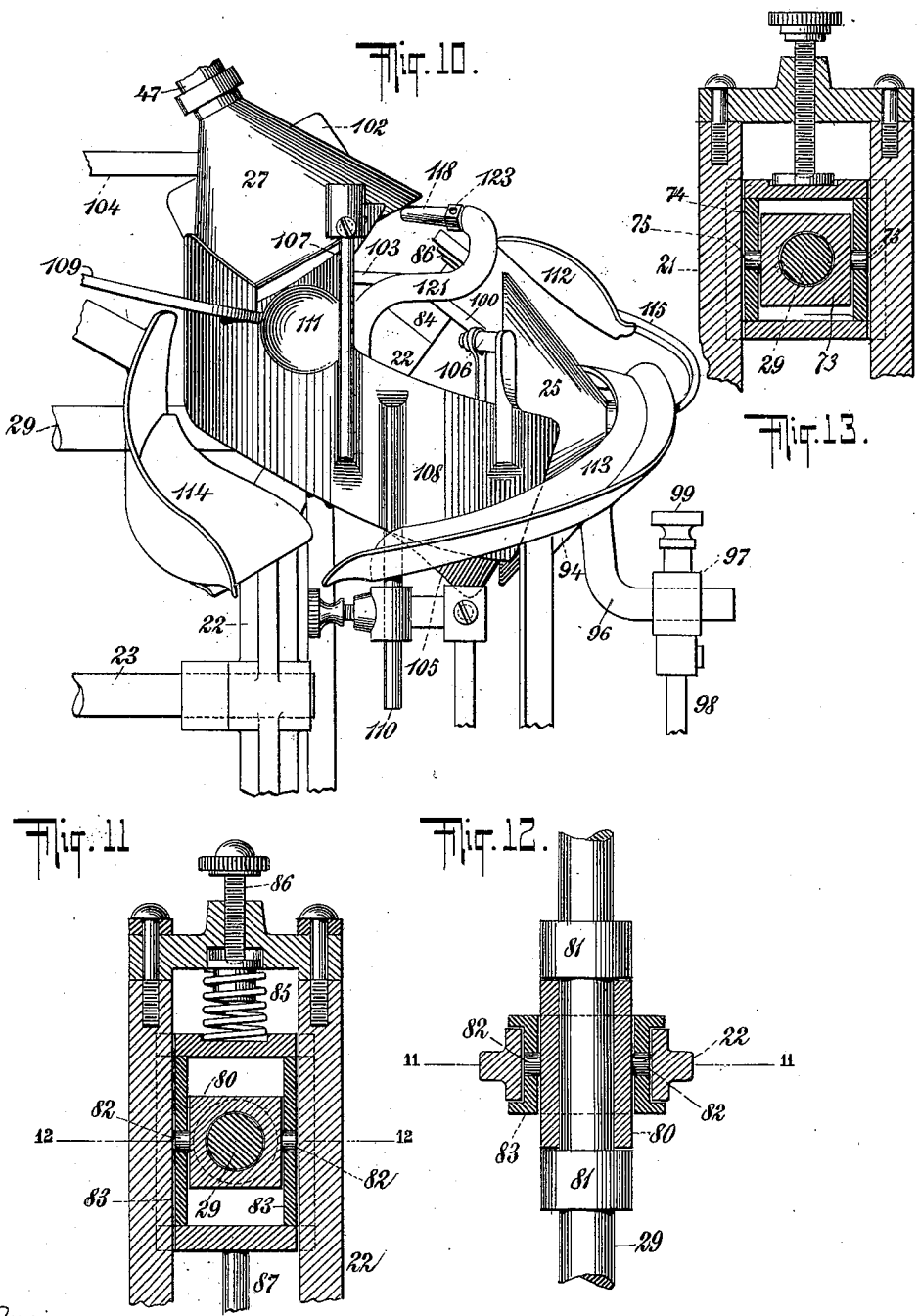
WITNESSES:
INVENTOR
William A. Zeidler
BY
Chas. C. Gill
ATTORNEY No. 646,784. Patented Apr. 3, 1900.
W. A. ZEIDLER.
MACHINE FOR FOLDING AND SHAPING TURN-DOWN COLLARS.
(Application filed Dec. 15, 1899.)

(No Model.) 6 Sheets—Sheet 6.

WITNESSES:

INVENTOR
William A. Zeidler
BY
ATTORNEY

United States Patent Office.

WILLIAM A. ZEIDLER, OF NEW YORK, N. Y., ASSIGNOR, BY DIRECT AND MESNE ASSIGNMENTS, OF ONE-HALF TO GILBERT A. CLARK AND LEWIS W. HOPPS, OF SAME PLACE.

MACHINE FOR FOLDING AND SHAPING TURN-DOWN COLLARS.

SPECIFICATION forming part of Letters Patent No. 646,784, dated April 3, 1900.

Application filed December 15, 1899. Serial No. 740,417. (No model.)

*To all whom it may concern:*

Be it known that I, WILLIAM A. ZEIDLER, a citizen of the United States, and a resident of New York, in the county of New York and State of New York, have invented certain new and useful Improvements in Machines for Folding and Shaping Turn-Down Collars, of which the following is a specification.

The invention relates to improvements in machines for folding and shaping turn-down collars and similar articles; and it consists in the novel features and combinations of parts hereinafter described, and particularly pointed out in the claims.

The object of the invention is to provide a machine which will uniformly and properly fold and shape the collars in a manner which will render the latter entirely satisfactory to the wearer and not injure the collar.

One of the main features of the machine made the subject of this application is a conical disk which rotates in conjunction with a rotatable grooved disk, the edge of the conical disk moving within the groove formed in the said rotatable grooved disk, and the said disks receiving between them the collar to be shaped and folded, the folded edge of the said collar moving along the groove of the said grooved disk and its opposite sides or folded portions passing along the opposite surfaces of said conical disk. An important feature of the preferred construction of the said conical disk is that its walls have a thickness which is greater at their outer edge than at their inner end or apex, whereby during the shaping and folding of the collar a proper space is left between the folds of the latter to receive the neckband or necktie, and the folded edge of the collar is given a rounded appearance instead of a flat edge. The coöperating disks above referred to are equipped with suitable means whereby the said disks may be heated, the conical disk is provided with guiding-plates for the folded sides of the collars, and means are applied for varying the relation between the said coöperating disks.

In addition to the features hereinbefore referred to the machine made the subject of this application comprises an additional conical disk with a coöperating grooved disk to receive the collars after they have passed through the first two coöperating disks for the purpose of completing and finishing the same. The second conical disk is smaller in diameter and made upon a more acute angle than the first conical disk. The second conical disk and its coöperating grooved disk are not necessarily of use with all classes and sizes of turn-down collars, but will prove to be of great advantage with some of the existing styles of turn-down collars, the latter passing between the first pair of disks and automatically traveling to and between the second pair of disks and then being discharged from the machine. The second pair of coöperating disks will be equipped with heating means and with means for varying the relation of the conical disk to its coöperating grooved disk.

The entire machine is automatic in its action, and the collars are simply fed to the first pair of disks and then pass from said pair of disks to the other pair of disks and automatically leave the machine in a finished condition ready for wear. The collars will be ironed in their usual flat form prior to being introduced to the present machine, and after having been ironed the collars will be slightly dampened along the line upon which the fold is to be formed. The attendant will then partly fold on the dampened line one end of the collar and feed that end of the collar between the first pair of disks, whereupon the said pair of disks will draw the collar into and the same will pass through the machine without further attention on the part of the attendant. The collars will be fed to and automatically leave the machine one after another in rapid succession.

The invention will be fully understood from the detailed description hereinafter presented, reference being had to the accompanying drawings, in which—

Figure 2:
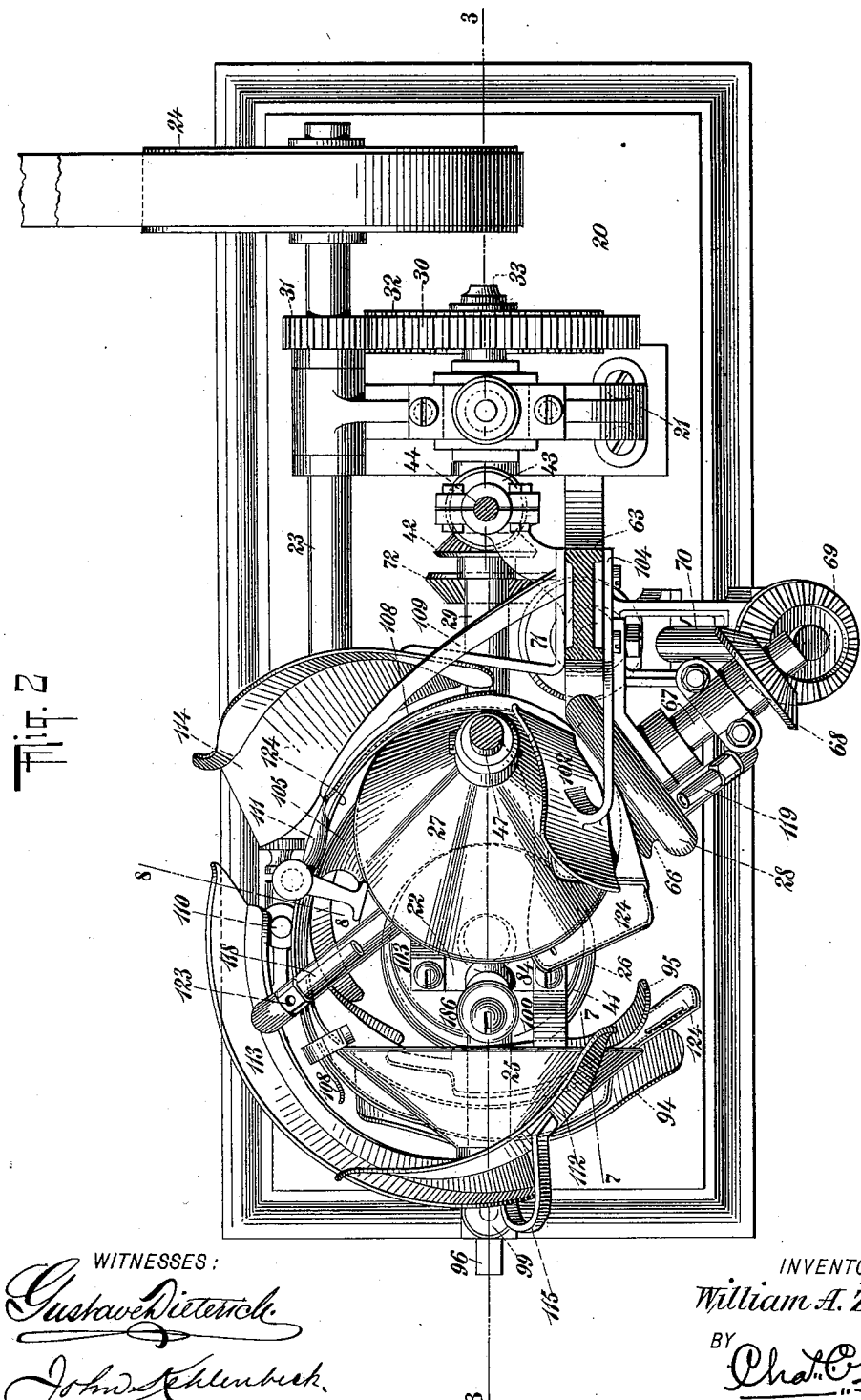
Figure 14:
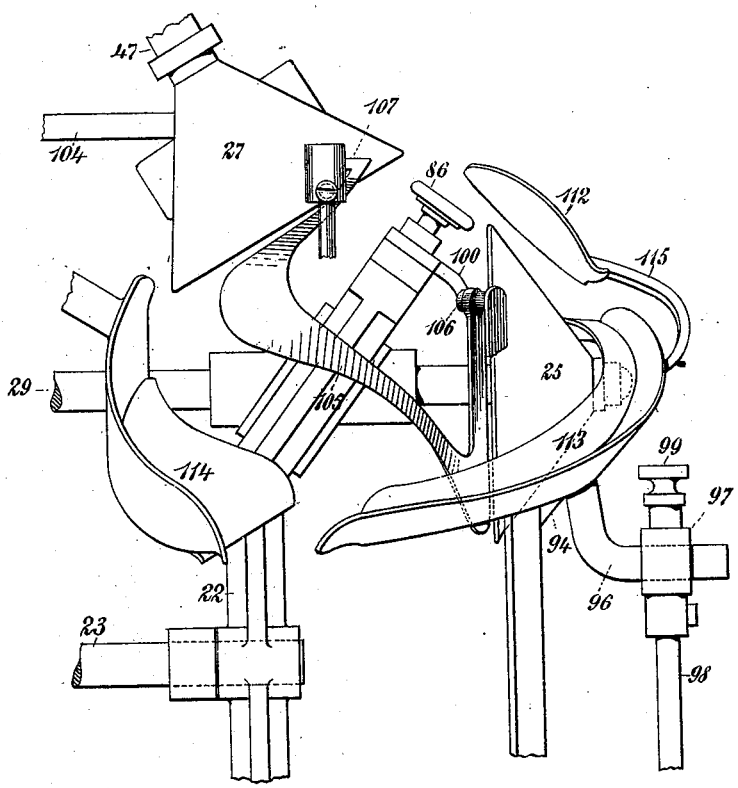

Figure 1 is a side elevation of a machine constructed in accordance with and embodying the invention. Fig. 2 is a horizontal section of same on the dotted line 2 2 of Fig. 1 and looking downward upon the main portion of the machine. This figure shows a collar on its passage between the two pairs of coöperating disks. Fig. 3 is a central vertical longitudinal section through the machine and collar on the dotted line 3 3 of Fig. 2. Fig. 4 is a detached central vertical longitudinal section through one of the conical disks—in this instance the first disk which receives the collar. Fig. 5 is a detached side elevation of the guide which is disposed intermediate the two conical disks and directs the collar from the first pair of disks to the second pair of disks. Fig. 6 is a front end view of the machine, partly in section, on the dotted line 6 6 of Fig. 3. Fig. 7 is an enlarged detached sectional view, partly broken away, on the dotted line 7 7 of Fig. 2 and illustrates a collar in transit between the first conical disk and its coöperating grooved disk, the said collar being folded upon the walls of the conical disk and there maintained during transit by the guides or plates disposed at the opposite sides of the said walls and at a sufficient distance from the latter to permit the collar to conveniently pass between said guides and said walls. Fig. 8 is an enlarged vertical sectional view through a portion of the machine on the dotted line 8 8 of Fig. 2 and illustrates the passage of the collar to the upper or second pair of disks, the collar being directed in its movement by the guide illustrated in Fig. 5. Fig. 9 is a vertical section through a portion of a collar and is presented to illustrate the rounded fold or edge imparted to the collar by the machine made the subject hereof. Fig. 10 is a detached side elevation of a portion of the rear side of the machine and is presented to more fully illustrate the passage the collar will take from the lower to the upper pair of coöperating disks and also the discharging-guides which direct the finished collars from the machine. Fig. 11 is a transverse section through the upper portion of one supporting-standard 22 of the machine and illustrates more particularly the bearing for the shaft of the lower conical disk, said section being on the dotted line 11 11 of Fig. 12, which is a horizontal section of same on the dotted line 12 12 of Fig. 11. Fig. 13 is a detached vertical section through the upper portion of one of the supporting-standards on the dotted line 13 13 of Fig. 1; and Fig. 14 is a detached side elevation of a portion of the rear side of the machine and is presented to illustrate more fully the location of the intermediate guiding-plate 105 between the conical disks 25 27, the rear exterior plate 108 being omitted from this figure.

In the drawings, 20 denotes the bed-plate of the machine. 21 22 represent convenient standards for supporting the mechanism, and 23 indicates the main driving-shaft, to which a suitable power-wheel 24 will be applied, as more clearly indicated in Figs. 1, 2, and 6.

The first or receiving conical disk is designated by the numeral 25 and its coöperating grooved disk by the numeral 26, while the second conical disk is numbered 27 and its cooperating grooved disk 28. The conical disks 25 and 27 and grooved disks 26 28 are mounted upon shafts, to which motion is communicated in order that the conical disk 25 and grooved disk 26 may have a simultaneous rotation in the same direction and that the conical disk 27 and its coöperating grooved disk 28 may likewise have a simultaneous rotation in the same direction.

The conical disk 25 is secured upon the left-hand end of the shaft 29, having upon its right-hand end the gear-wheel 30, which receives its motion from the main driving-shaft 23 through the intermediate gears 31 32, the gear-wheel 31 being a pinion secured upon the driving-shaft 23, and the gear-wheel 32 being mounted upon a stud 33, extending from the standard 21, and said gear-wheel 32 being in mesh with the gear-wheel 30, secured upon the shaft 29. The gear-wheel 32 is an intermediate gear and is in engagement with the gear-wheel 34, secured upon the right-hand end of the shaft 35, Fig. 1, which carries at its left-hand end the beveled gear-wheel 36, engaging the like gear-wheel 37, secured upon the shaft 38 for the grooved disk 26, said shaft 38 being held within the journal-box 39, and the latter receiving its support from the bracket 40, extending toward the left from the standard 22. Thus the shaft 29 for the conical disk 25 and the shaft 38 for the grooved disk 26 receive simultaneous motion in the same direction from the main driving-shaft 23, the shaft 29 receiving its motion through the gear-wheels 31, 32, and 30 and the shaft 38 receiving its motion through the gear-wheels 31, 32, and 34, shaft 35, and gear-wheels 36 and 37.

The conical disk 25 is in the form of a hollow cone whose base edges move within the groove 41 of the disk 26 without contacting with the walls of said groove, and in its preferred form the conical disk 25 will have tapered walls, as more clearly shown in Figs. 4 and 7, said walls being thicker at their outer or base edge than at the apex of the cone, this form of the conical disk 25 being of value, since by means thereof the collars are given a rounded folded edge instead of a short sharp folded edge, and in addition a sufficient space is formed between the two parts or folds of the collar to readily receive the necktie or band. The groove 41 in the disk 26 is preferably disposed at an angle to the plane of the base edges of the conical disk 25 in order that the said groove may properly receive and coöperate with said edge of said conical disk and permit the collar to be properly moved along the opposite walls of the said conical disk. The body of the grooved disk 26 may be placed in any convenient relation to the conical disk 25; but the groove 41, which is the effective portion of the disk 26, should, as above explained, be at a suitable angle to the base edge of the conical disk 25 to coöperate with said base edge in shaping and folding the collars.

The conical disk 27 receives its motion from the main driving-shaft 23 and shaft 29, Figs. 1 and 3, through the medium of the bevel gear-wheels 42 43, vertical shaft 44, bevel gear-wheels 45 and 46, and shaft 47, the latter having secured to its lower end the said conical disk 27 and at its upper end the said bevel gear-wheel 46 and being mounted in bearing-boxes 48 49, (see Fig. 6,) the bearing-box 48 being pivotally supported within the bearing-frame 50, carried by the standard 63, which is supported by the standards 21 22, as indicated in Fig. 1. The bearing-box 48 is of rectangular shape, as indicated more clearly in Fig. 6, and is pivotally held within the bearing-frame 50 by means of trunnions or screws 51, which pass through the sides of said frame 50 and enter sockets in the sides of said box 48, the object of the trunnions or screws 51 being to permit of a limited pivotal or oscillating motion in said box 48 when the shaft 47 is raised and lowered from and toward the grooved disk 28. The lower bearing-box 49 for the shaft 47 is also of rectangular form and held between collars 52 53, rigid on the shaft 47, as indicated in Figs. 3 and 6, and said bearing-box 49 is provided with pins or trunnions 54, which extend outward laterally through elongated slots 55 in the frame 56 and are engaged by the lower forked ends of the arms 57, which comprise a part of the frame 58, (see Figs. 1 and 6,) which extend downward over the sides of the frame 56 and bear against the said trunnions or pins 54 for the purpose of keeping the shaft 47 and its conical disk 27 in their downward position in proper relation to the grooved disk 28 and of permitting an upward yielding of said conical disk 27. At the upper end of the frame 56 is a plate 59, which is rigid with the frame 56 and has a threaded aperture to receive the lower end of the screw 60, upon which is coiled a spring 61, the latter being between the upper end of the frame 58 and the lower flanged end of the head 62. By screwing the screw 60 downward or upward the tension of the spring 61 may be increased or diminished at will. The shaft 47 passes through the bearing-box 49, and the latter is capable of a limited motion by reason of the fact that its trunnions 54 pass through the elongated slots 55 of the frame 56; but said shaft 47 and its conical disk 27 are normally held in proper relation to the grooved disk 28 under the yielding force of the spring 61, the tension of which, as hereinbefore described, may be varied at will in accordance with the nature of the collars being passed through the machine. The shaft 47 is inclined, as illustrated in Figs. 1 and 3, and may be elevated to a limited extent by a treadle movement, as hereinafter described, without the bevel gear-wheel 46 upon its upper end passing entirely from engagement with the bevel gear-wheel 45, secured upon the upper end of the shaft 44. It might prove to be desirable, especially should a collar for any reason be caught upon the disk 27 without passing freely from the same, to elevate the said disk 27 from its relation to the disk 28 in order that the said collar might be extracted by hand, and in order that such result may be accomplished there is provided the pivoted lever 64, (see Figs. 1 and 3,) whose upper end contacts with the lower surface of the collar 65 on the pinion-wheel 46. By pulling downward on the lower end of the lever 64, the upper end of said lever, pressing against said collar 65, will move the shaft 47 upward, and thereby widen the distance between the edge of the conical disk 27 and the groove of the disk 28, thus freeing the collar and permitting it to be manually extracted from the machine. During the upward motion of the shaft 47 and disk 27 under the action of the lever 64 the frame 58 will by the trunnions 54 be moved upward against the stress of the spring 61, and upon the release of power from the lever 64 the spring 61 will restore the shaft 47 and conical disk 27 to their lower normal position in proper relation to the grooved disk 28. The means for operating the lever 64 will be of the foot-treadle nature and are hereinafter described. During the upward and downward motion of the shaft 47 and disk 27 the bearing-box 49 will move with the said shaft and the bearing-box 48 will remain stationary in its frame 50, but may oscillate sufficiently to permit of the motion of said shaft 47 without binding against the latter. When the shaft 47 moves upward, its lower end carrying the disk 27 moves outward from the disk 28, due to the slots 55 and trunnions 54. The conical disk 27 corresponds substantially with the conical disk 25, but is smaller in diameter than said disk 25 and has its walls on a more acute angle than the walls of the disk 25. The grooved disk 28 corresponds with the grooved disk 26, which coöperates with the conical disk 25, and said disk 28 contains a groove 66, corresponding with the groove 41 in the grooved disk 26. The grooved disk 28 also receives its motion from the main driving-shaft 23, the said disk 28 being secured upon the shaft 67, carrying the bevel gear-wheel 68, Fig. 1, in engagement with a like bevel gear-wheel 69, mounted upon the upper end of the shaft 70, whose lower end carries the bevel gear-wheel 71 in mesh with the like gear-wheel 72, secured upon the shaft 35 hereinbefore referred to. Thus the grooved disk 28 receives its motion from the main driving-shaft 23 through the medium of the pinion-wheel 31, intermediate gear-wheel 32, gear-wheel 34, shaft 35, bevel gear-wheels 72 71, shaft 70, bevel gear-wheels 69 68, and shaft 67, the latter of which carries said grooved disk 28.

The conical disk 25 should in the preferred form of the machine be equipped with means whereby its relation to the grooved disk 26 may be regulated and also with means whereby said disk 25 may be elevated from its operative relation to the disk 26, it being likely that with the shaping and folding of collars differing in thickness better results may be attained by regulating in accordance therewith the relation of the disks 25 and 26 with respect to one another, and it also being desirable that should for any reason a collar be caught between the disks of the machine instead of passing freely through the machine the disk 25 may be freely elevated from the disk 26, so that the collar thus caught could be manually extracted, and to these ends the shaft 29, carrying the conical disk 25, is at its right-hand end mounted within a bearing-box 73, Figs. 1, 3, and 13, held between the sides of a frame 74 upon trunnions or pins 75, (shown by dotted lines in Figs. 1 and 3 and full lines in Fig. 13,) the trunnions or pins 75 being rigid with the box 73 and entering apertures in the sides of the said frame 74, the purpose being to allow the shaft 29 to have a limited sliding motion through the box 73 and to enable said box 73 to have a slight pivotal action upon the trunnions 75 during the longitudinal movement of the said shaft 29. The left-hand portion of the shaft 29 is supported within a bearing-box 80, Figs. 1, 3, 11, and 12, which is held upon said shaft between the collars 81 81 and is supplied with trunnions or pins 82, freely entering apertures in the sides of a frame 83, adapted to slide between the sides of the upper deflected portion 84 of the standard 22. The frame 83 is yieldingly pressed to its lower position by means of a spring 85, Figs. 3 and 11, which presses upon the said frame 83 and the tension of which may be regulated by a screw 86. The spring 85 permits the frame 83, bearing-box 80, and shaft 29 to yield upward, so that at no time can too great a pressure come upon the collar intermediate the conical disk 25 and grooved disk 26. It is desired also that the operator may be enabled to elevate the conical disk 25 out of operative relation with the disk 26 should he desire to do so, and hence the frame 83 is, as indicated in Fig. 3, connected at its lower end with the inclined rod 87, which by means of a ball-and-socket joint 88 is connected with one arm 89 of a bell-crank lever 90, whose other arm is connected by a rod 91 or otherwise with a usual foot-treadle. (Not shown.) By pulling downward by means of the foot-treadle upon the connection 91 the bell-crank lever 90 may be turned upon its pivot 92 and the rod 87 forced upward, thereby moving the frame 83 upward and toward the left against the stress of the spring 85 and elevating the edge of the conical disk 25 from the groove 41 of the disk 26, thus leaving abundant space for the extraction of a collar. Because of the fact that the shaft 29 and disk 25 move toward the left the gear-wheel 32 is made wider than the gear-wheel 30, so that during the movement toward the left of the shaft 29 the gear-wheel 30 will not lose its engagement with the said gear-wheel 32. It is better that the connection 91, leading from the bell-crank lever 90 to the foot-treadle, be counterbalanced, so that normally said connection will have no influence toward elevating the rod 87, and hence the arm 89 of said bell-crank lever 90 has a counterbalance-weight 192, which weight will pull downward on the rod 87. For the purpose of positively controlling the relation of the conical disk 25 to the grooved disk 26, so that under no circumstances will the edge of the conical disk be enabled to pass into undue close relation to the walls of the grooved disk 26, the bell-crank lever 90 is provided with the adjustable stop-screw 116, whose end is adapted to contact with the lower edge of the framing of the machine, and thereby prevent any undue downward motion of the arm 89 of said bell-crank lever 90. When the end of the stop-screw 116 is in contact with the frame of the machine, it prevents the arm 89 from having any downward motion, and hence at such time the said arm 89 prevents the rod 87, connected with the bearing-box 80 for the shaft 29, from having any downward motion. Thus the stop-screw 116 is employed to limit the normal relation of the shaft 29 and conical disk 25 with the grooved disk 26, and this relation may be adjusted to suit the various thicknesses of collars by means of the stop-screw 116.

In machines employing the two conical disks 25 and 27 it is desirable that both of said disks should elevate and descend together under the action of the foot-treadle, hereinbefore referred to, since a collar might be so caught in the machine as to be held by both disks 25 and 27 at one time, and hence the pivoted lever 64 for the upper disk 27 is connected with the bell-crank lever 90 by means of a rod or other connection 93, so that when pressure is applied upon the foot-treadle the bell-crank lever 90 may be utilized to simultaneously elevate both the disks 25 and 27 from their respective coöperating grooved disks 26 and 28.

For the purpose of directing the collars and keeping them in proper relation to the conical disks the disk 25 is equipped with guiding-plates 94 and 95, which are curved to substantially conform to the outer and inner walls of the disk 25, and said plates 94 and 95 flare outwardly from one another at their front or entering portions, as shown in Figs. 1 and 2, so that the collar may be readily inserted upon the disk 25, with its folded portions between the opposite walls of the said disk and the facing sides of said plates 94 95. The guiding-plate 94 is supported by an arm 96, which passes through a slot in a frame 97, supported upon the upper end of a vertical rod 98, and the frame 97 is provided with a thumb-screw 99, which may be tightened down upon the horizontal portion of the arm 96. The arm 96 and frame 97 permit of the adjustment of the guiding-plate 94 toward and from the conical disk 25 to meet the requirements of the different kinds of collars to be shaped and folded. The guiding-plate 95 is supported by means of an arm 100, which extends downward from the upper end of the main supporting-standard 22, to which it is fastened by a screw.

The upper conical disk 27 is supplied with inner and outer guiding-plates 101 102, respectively, Figs. 1, 3, 6, and 8, substantially corresponding in their purpose with the guiding-plates 94 and 95 for the conical disk 25. The inner guiding-plate 101 for the upper conical disk 27 is supported by means of an arm 103, secured to the upper end of the standard 22, as more clearly shown in Fig. 3, and the outer guiding-plate 102 for said conical disk 27 is adjustably supported from the standard 63 by means of an arm 104, the latter being capable of adjustment upon said standard 63, as indicated in Fig. 1, so that the relation of said plate 102 to the outer wall of the conical disk 27 may be regulated at will.

Intermediate the conical disks 25 and 27 and passing from the edge of one disk to the edge of the other disk is provided the guiding-plate 105, (shown in detail in Fig. 5,) this plate 105 directing the collar from the disk 25 to the disk 27 and during the passage of the collar from said disk 25 to the disk 27 being between the folds of the collar, as shown in Fig. 8, the collar as it is fed along by the disks 25 26 passing directly along the said guiding-plate 105 and from said guiding-plate 105 directly between the disks 27 28, the purpose of the guiding-plate 105 being to properly direct the collar from the conical disk 25 to the conical disk 27 without permitting said collar to escape from the machine or from under positive control. The guiding-plate 105 describes a curved line from the edge of the disk 25 to the edge of the disk 27 and is supported at its upper ends 106 107, respectively, from a main exterior curved plate 108, Fig. 10, which lies at the outer side of said plate 105 and extends from the outer side of the rear portion of the disk 25 upward to the outer side of the rear portion of the disk 27 and keeps the collars close up against the said guiding-plate 105. This exterior plate 108 aids in guiding the end of the collar upon the walls of the disk 27 in the same manner that the guiding-plate 94 aids in guiding the first end of the collar to the disk 25. The plate 108, however, instead of being of limited extent and confined to but one conical disk extends at the rear side of the machine from the conical disk 25 to the conical disk 27, thereby aiding in guiding the collar from the disk 25 to and upon the disk 27 under the direction of the guiding-plate 105, which is then in between the folds of the collar.

The guiding-plate 108 is supported at one end from the standard 63 by means of an arm 109, Figs. 2 and 10, and at its other end or portion said guiding-plate 108 is held upon a vertical rod 110, Fig. 10, which is adjustably supported from the framework of the machine. The plate 108, adjacent to the upper conical disk 27, may have an inwardly-projecting convex portion 111 to aid in turning the collar inward toward the said conical disk 27. The lower portion of the plate 108 turns inward, as clearly shown in Figs. 3 and 8, to form a support for the lower edge of the collar during its passage to the upper disks 27 and 28.

All of the guides for guiding the collar in contact with the conical disks 25 27 have been hereinbefore described, and the guides for discharging the collars from the machine and protecting them from contact with the working parts of the machine will now be described. These latter guides for directing the discharge of the collars as they issue toward the front from the upper conical disk 27 are numbered 112, 113, and 114, and all of them may be observed upon reference to Figs. 1, 2, and 10. The guide 112 is simply a curved plate supported by an arm 115 over the conical disk 25, and the collar after leaving the conical disk 27 enters between the outer surface of the conical disk 25 and said guide 112 and is by the latter directed toward the rear side of the machine, where it will fall from the machine without interfering with the operator sitting at the front of the machine and feeding collars to the coöperating disks 25 26. As the collar is discharged rearwardly under the direction of the guide-plate 112 it will naturally descend upon the trough-like guides 113 and 114 and continue to travel rearward until it falls from the machine. The invention is not, however, limited to the use of the discharging-guides 112, 113, and 114, since, if preferred, the collars may be allowed to discharge at the front side of the machine directly to the operator, who there will sit to feed the collars to the first pair of disks 25 26.

The machine when in use should have the conical disks 25 27 and grooved disks 26 28 heated, and to this end I provide gas-burners for the said disks, the burner for the conical disk 25 being numbered 117, Fig. 3, that for the conical disk 27 being numbered 118, that for the grooved disk 28 being numbered 119, and that for the grooved disk 26 being numbered 120. The burners 117, 118, 119, and 120 will be connected with suitable piping 121, leading from the source of gas-supply 122, Fig. 6, in any convenient manner, the only necessary conditions to be observed being that the gas-piping 121 shall not interfere with the passage of the collars and that the burners will be so disposed as not to cast their flames upon the collars, but upon the shaping and folding disks at points removed from the collars. In order that the gas-burners shall not smut the shaping and folding disks, the said burners should be provided with air-inlets 123, so that the flames will be of a blue character, which will heat without depositing carbon.

Operation: The operation of the machine made the subject of this application will be largely understood from the description hereinbefore presented. It may be well, however, to briefly summarize the operation of the machine, and first it is to be understood that the collars, before being introduced to the machine, will be ironed in their usual flat form and after having been ironed will be slightly dampened along the line upon which the fold of the collar is to be formed. The attendant will then partly fold on the dampened line one end of the collar and feed that end of the collar between the shaping-disks 25 26, the inner fold of the collar entering along the inner wall of the conical disk 25 and the outer fold of the collar passing along the outer wall of the said conical disk, while the folded edge or portion of the collar will engage the outer edge of the said conical disk and the walls of the groove 41 in the disk 26, as indicated in Fig. 7, in which the numeral 124 denotes the collar. The collar will be caught between the disks 25 and 26 and be carried along until it has passed entirely through said disks, being guided by the plates 94 and 95. If the machine did not possess the upper disks 27 and 28, the collars would, after passing through the disks 25 26, be at once discharged from the machine; but when the machine is equipped with the disks 27 28 the collars after passing through the disks 25 26, instead of being discharged from the machine, will, as shown in Figs. 2, 3, and 8, pass upward upon the guide 105 and in contact with the exterior guide-plate 108 and go directly to the upper shaping and folding disks 27 28, between which the collars will pass in the same manner that they pass between the disks 25 26, and be discharged from the machine, being guided in their discharge by the discharge-guides 112, 113, and 114. In Fig. 2 I illustrate a collar 124 in transit through the machine and as commencing to be discharged from the upper disks 27 and 28. The collar 124 is also indicated in Figs. 3, 7, 8, and 9. The collars are one after another in succession fed to the disks 25 26 and are in reasonably-rapid succession discharged by the disks 27 28. The upper disks 27 28 complete the final shaping of the collar, so as to give it a uniform appearance suitable for wear; but with many classes of collars the upper disks 27 and 28 will not be required, since the first pair of disks 25 26 are entirely sufficient for both shaping and folding many classes of collars. There are some styles of collars, however, which receive a more finished appearance by being passed through both the lower pair of disks 25 26 and the upper disks 27 and 28, and therefore, while the employment of the disks 27 and 28 is recommended, it is to be understood that the invention is not limited in every instance to the employment of said upper disks 27 28. By means of the invention the collars may be very rapidly shaped and folded without danger of injury to the collars, and this feature of the invention is of considerable importance, since when the collars are folded and shaped by the machine made the subject of this application they not only receive a more elegant appearance, but are not in the slightest degree injured along the edge of the fold. When the conical disks 25 27 have tapered walls, as shown in Figs. 4 and 7, a comfortable rounding edge will be formed along the fold of the collar instead of a disagreeable sharp edge and abundant space will be left between the folds of the collar to receive and permit the convenient adjustment of the necktie or band.

In instances in which both the lower and the upper pair of coöperating disks are employed both pairs of disks contribute to the proper folding, shaping, and setting of the collar, and in instances in which the upper or second conical disk is of smaller diameter than the first or receiving conical disk the collar is partially curved in the desired direction on the first or larger conical disk and is then completed on the reduced curve or arc by the second or smaller conical disk.

What I claim as my invention, and desire to secure by Letters Patent, is—

1. In a collar folding and shaping machine, a conical disk, a grooved disk coöperating therewith and receiving within its groove the edge of said conical disk, and guides adjacent to the inner and outer walls of the conical disk for compelling the folded portions of the collar to travel on the inner and outer walls of the conical disk; substantially as set forth.

2. In a collar folding and shaping machine, a conical disk, a grooved disk coöperating with said conical disk and receiving within its groove the edge of the said conical disk, means for rotating said disks simultaneously and in the same direction, guides at the inner and outer walls of the said conical disk for causing the folded portions of the collar to travel on the inner and outer surfaces of said conical disk, and means for positively varying the distance between the coöperating portions of said disks, thereby adapting the said disks to collars varying in size or thickness; substantially as set forth.

3. In a collar folding and shaping machine, the conical disk and its coöperating grooved disk to receive the collar from the operator, combined with the additional conical disk and its coöperating grooved disk to receive the collar after the latter has passed between the first pair of disks, with means for rotating said disks; substantially as set forth.

4. In a collar folding and shaping machine, the conical disk and its coöperating grooved disk to receive the collar from the operator, combined with the additional conical disk and its coöperating grooved disk to receive the collar after the same has passed between the first pair of disks, the said additional conical disk being smaller in diameter than the first conical disk; substantially as set forth.

5. In a collar folding and shaping machine, the conical disk, and coöperating grooved disk to receive the collar from the operator, combined with the additional conical disk and coöperating grooved disk to receive the collar from the first-mentioned pair of disks, means for rotating said disks, and guides for causing the folded portions of the collar to travel along the inner and outer surfaces of said conical disks; substantially as set forth.

6. In a collar folding and shaping machine, the conical disk and coöperating grooved disk to receive the collar from the operator, combined with the additional conical disk and coöperating grooved disk to receive the collar from the first-mentioned pair of disks, and guides for causing the folded portions of the collar to travel along the inner and outer surfaces of said conical disks, the second conical disk being of smaller diameter and having more acute wall-surfaces than the first or receiving conical disk; substantially as set forth.

7. In a collar folding and shaping machine, the conical disk and coöperating grooved disk to receive the collar from the operator, combined with the additional conical disk and coöperating grooved disk to receive the collar from the first-mentioned pair of disks, means for rotating said disks, guides for causing the folded portions of the collar to travel along the inner and outer surfaces of said conical disks, and a guide for automatically directing the collar from the first pair of disks to the second pair of disks; substantially as set forth.

8. In a collar folding and shaping machine, the conical disk with its coöperating grooved disk to receive the collar from the operator, and the second conical disk with its coöperating grooved disk to receive the collar from the first pair of disks, the shafts of said conical disks being at an angle to one another, combined with guide-plates at the inner and outer sides of said conical disks to compel the folded portions of the collar to follow said sides, a guide extending from the edge of one conical disk to the edge of the other conical disk upon which the collar may travel and be directed from the first to the second conical disk, and an exterior guide following the line of the guide connecting the conical disks and passing from the exterior side of one conical disk to the exterior side of the other conical disk; substantially as set forth.

9. In a machine for shaping and folding collars a conical disk and a grooved roller coöperating therewith and receiving within its groove the edge of the said conical disk, the said conical disk having tapered walls converging toward the apex of the disk; substantially as set forth.

10. In a collar folding and shaping machine, a conical disk and a grooved disk coöperating therewith and receiving within its groove the edge of said conical disk, means for heating said disks, and inner and outer guides for compelling the folded sides of the collar to travel on inner and outer surfaces of the conical disk; substantially as set forth.

Signed at New York, in the county of New York and State of New York, this 14th day of December, A. D. 1899.

WILLIAM A. ZEIDLER.

Witnesses:
CHAS. C. GILL,
GUNDER GUNDERSON.